Sept. 7, 1937.  A. D. STIDHAM  2,092,683
TRAILER GUIDE
Filed April 28, 1937  2 Sheets-Sheet 1
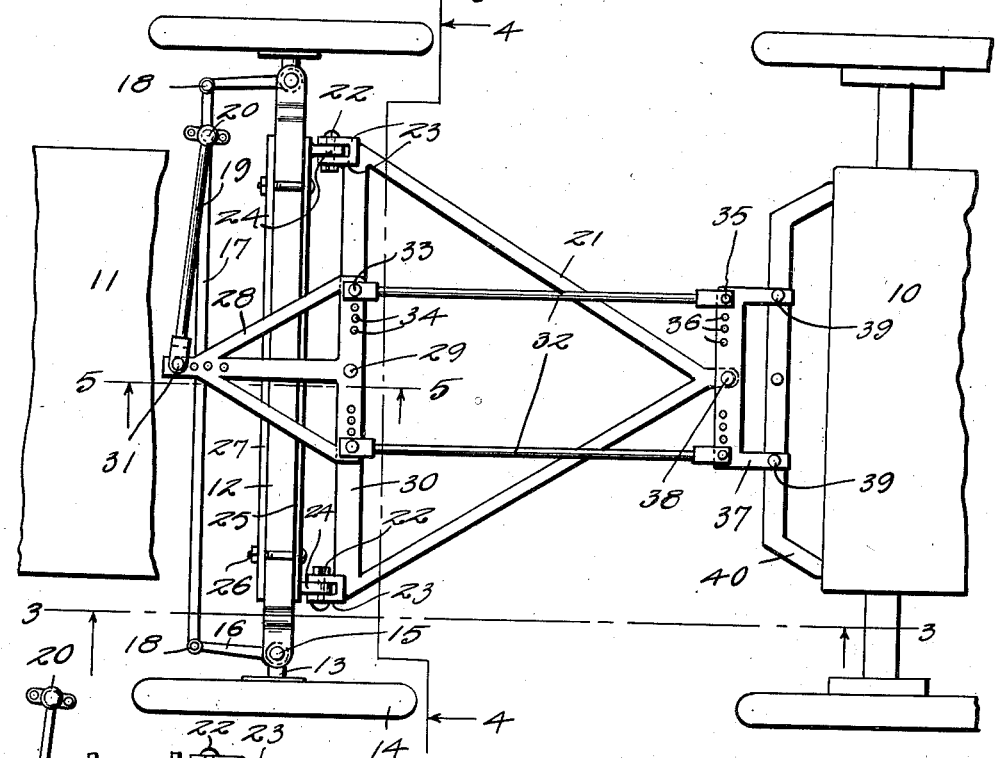
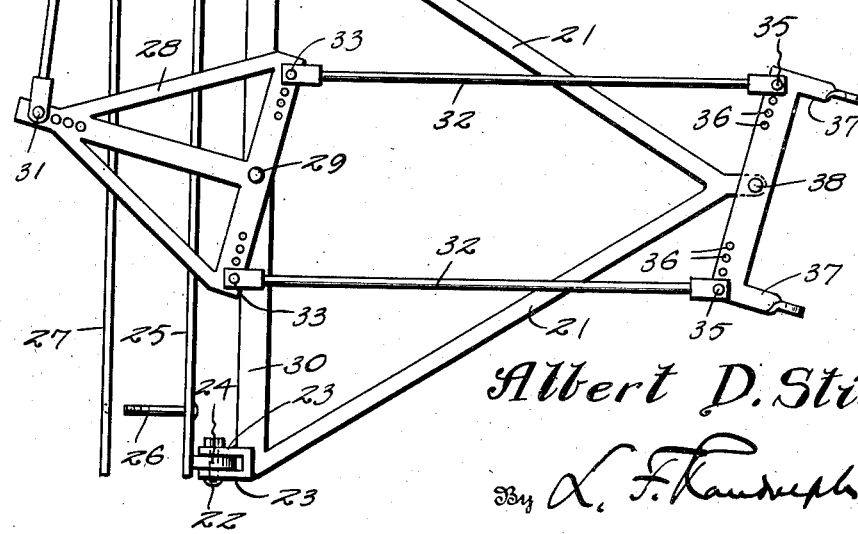
Inventor.
Albert D. Stidham
By L. F. Randolph
Attorney Sept. 7, 1937.  A. D. STIDHAM  2,092,683
TRAILER GUIDE
Filed April 28, 1937  2 Sheets-Sheet 2
Fig. 3.
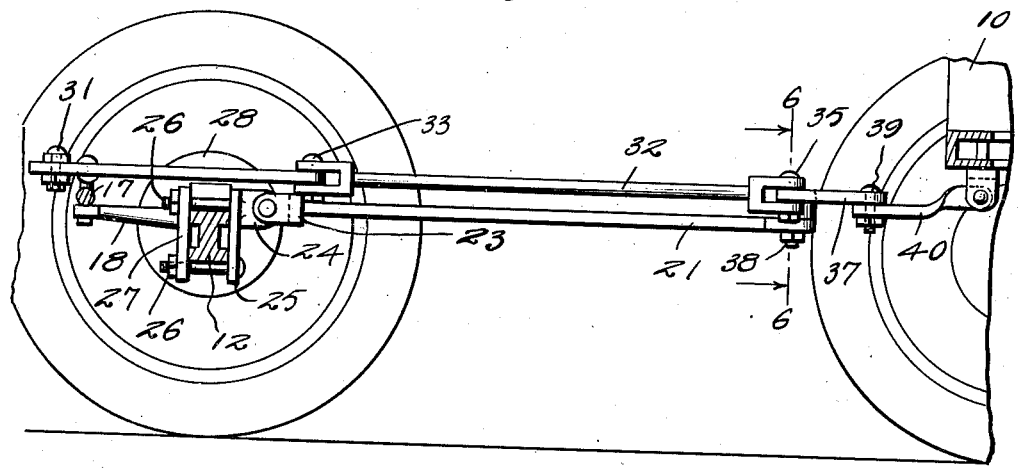
Fig. 4.
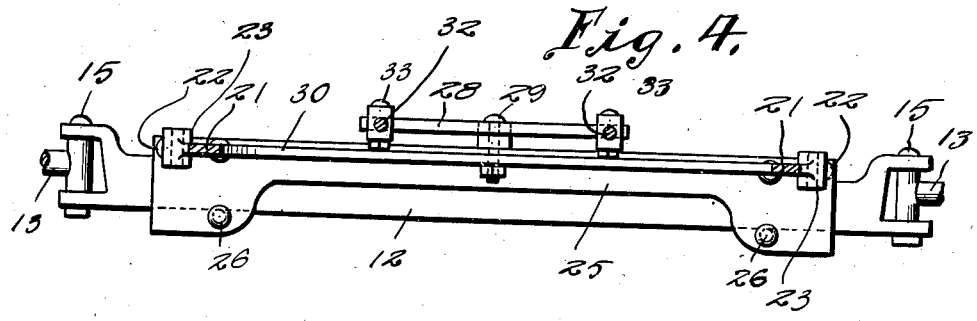
Fig. 5.
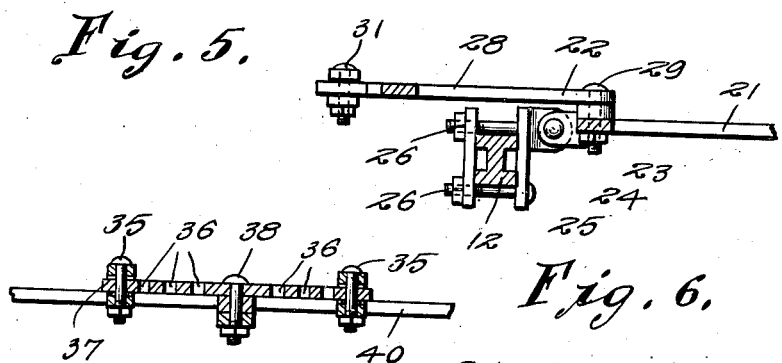
Fig. 6.
Inventor
Albert D. Stidham
By A. F. Randolph
Attorney Patented Sept. 7, 1937

2,092,683

UNITED STATES PATENT OFFICE 2,092,683

TRAILER GUIDE

Albert D. Stidham, Chandler, Ariz.

Application April 28, 1937, Serial No. 139,615

2 Claims. (Cl. 280—33.55)

This invention relates to a guide for trailers enabling a trailer to be hitched to a propelling or draft vehicle in a manner to steer automatically through movement of the draft vehicle and a connection which makes backing practical.

More specifically it is aimed to provide a construction which will keep the front wheels in perfect line with the rear wheels of the towing or draft vehicle, to steer the former, in a manner so that the trailer cannot whip, wabble or shimmy. In addition, the trailer cannot jackknife, which is caused by the action of the two pivots now used. A particular object of the present improvement is to provide a guide having but a single pivot at the connection of the guide to the draft or towing vehicle.

The more specific objects and advantages will become apparent from a consideration of the description following taken in connection with accompanying drawings illustrating an operative embodiment.

In said drawings:—

Figure 1 is a plan view showing my improvements in connection with a draft and trailing vehicle, both being shown fragmentarily;

Figure 2 is a plan view of the guide, detached, and in the position assumed when the vehicles are turning;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1, and

Figure 6 is a sectional view taken on the line 6—6 of Figure 3.

Referring specifically to the drawings wherein like reference characters designate like or similar parts, 10 designates a draft vehicle which may be an automobile, truck or the like and 11 designates a trailer which may be an automobile or any two or four wheeled vehicle or conveyance.

The trailer is shown as having a front axle 12 in which mountings 13 for front or steering wheels 14, are journaled on vertical axes 15. Rearwardly extending arms 16 on the mountings 13 are pivotally connected to a cross rod 17 at the ends 18, and a steering rod 19 is connected to the rod 17 at 20 preferably by means of a ball and socket joint.

A triangular frame 21 is fastened to the axle 12 as by means of bolts 22 passed through lugs 23 on the frame 21 and lugs 24 on a bar 25 bolted at 26 to the axle. Bar 25 is in the nature of a clamping member and a clamping member 27 is disposed on the other side of the axle and the bolts 26 also pass through it.

A triangular lever 28 is pivoted by means of a bolt 29 to the horizontal arm 30 of the frame 21 and it is also pivoted by a bolt 31 to the steering rod 19.

Parallel arms or cables 32 by means of bolts 33 are adjustably secured in openings 34 of the lever 28 and by means of bolts 35, they are adjustably secured in openings 36 of a draw-bar 37 pivoted by means of a bolt 38 to the forward end of frame 21. Said lever at opposite ends has forward extensions which are bolted at 39 to a bracket or other part 40, connected to the draft vehicle 10.

As a result of the construction described, the trailing vehicle 11 will be automatically steered through the movement of the draft vehicle 10, since turning of the draft vehicle will correspondingly move the lever 37 as suggested in Figure 2, causing the parallel rods 32 to correspondingly tilt the lever 28 and move the steering rod 19, thereby actuating the steering gear of the wheels 14 of the trailing vehicle.

Various changes may be resorted to provided they fall within the spirit and scope of the invention.

I claim as my invention:—

1. A guide of the class described comprising a frame having a rear arm and arms extending forwardly therefrom to each other, a lever pivoted to the rear arm midway of its ends, means for connecting the latter lever to the steering gear of a trailer, clamp means attachable to the front axle of the trailer, said clamp means having a part detachably connected to said rear bar, a draw-bar pivoted to the frame adjacent the junction of the second mentioned arms and attachable to a draft vehicle, and parallel members connected to the draw-bar and lever on opposite sides of their axes.

2. A guide of the class described comprising a frame having a rear arm and arms extending forwardly therefrom to each other, a lever pivoted to the rear arm midway of its ends, means for connecting the latter lever to the steering gear of a trailer, clamp means attachable to the front axle of the trailer, said clamp means having a part detachably connected to said rear bar, a draw-bar pivoted to the frame adjacent the junction of the second mentioned arms and attachable to a draft vehicle, parallel members connected to the draw bar and lever on opposite sides of their axes, said draw bar and lever having series of openings therein and said members being selectively attachable in said openings according to the adjustment desired.

ALBERT D. STIDHAM.